B. F. HUTCHES, Jr.
ELECTROMOTOR.
APPLICATION FILED MAY 3, 1910.
1,116,705.
Patented Nov. 10, 1914.
2 SHEETS—SHEET 1.
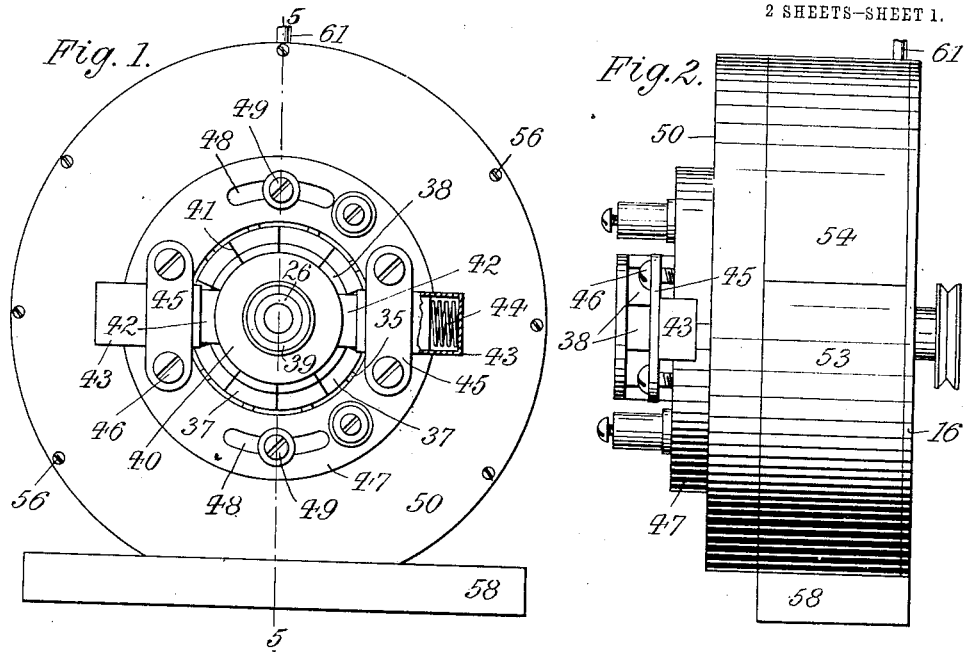
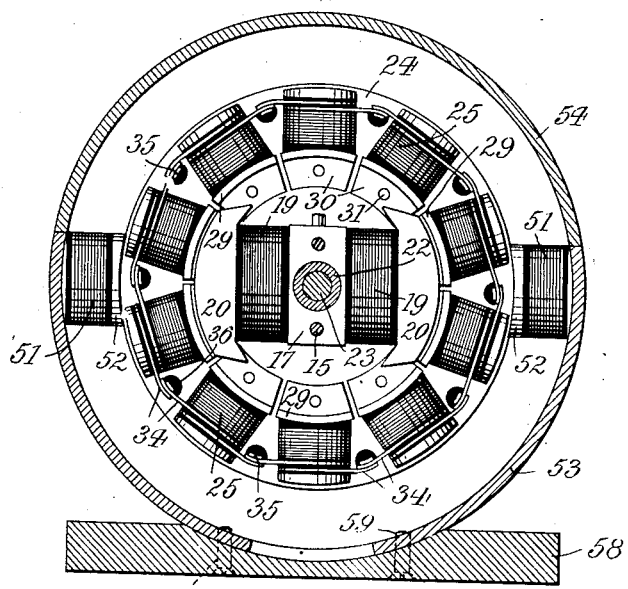
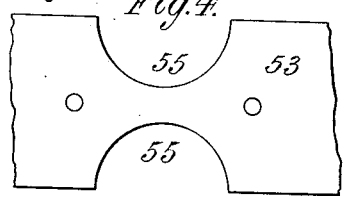
WITNESSES:
Katheryne Koch
Daniel Holmgren
INVENTOR
Benjamin F. Hutches Jr.
BY
Frieser & Junger
ATTORNEYS B. F. HUTCHES, Jr.
ELECTROMOTOR.
APPLICATION FILED MAY 3, 1910.
1,116,705.
Patented Nov. 10, 1914.
2 SHEETS—SHEET 2.
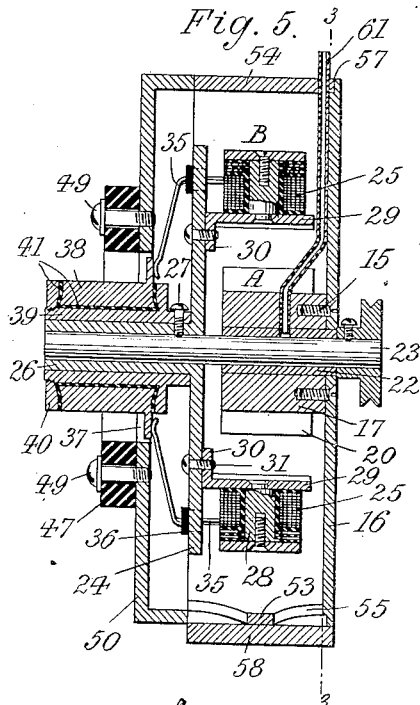
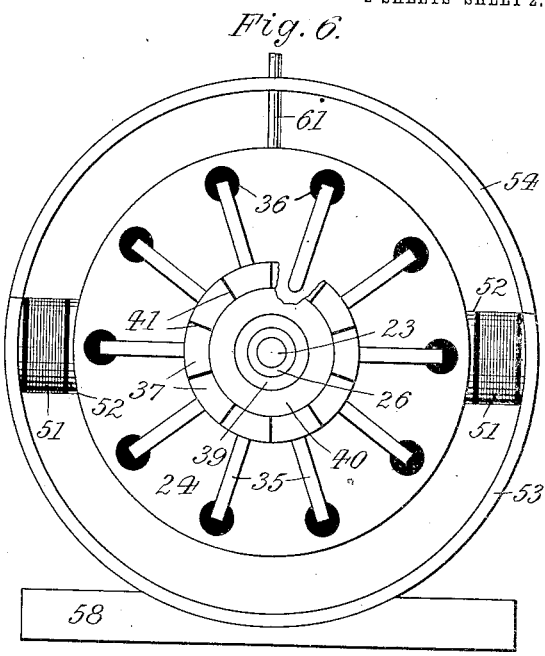
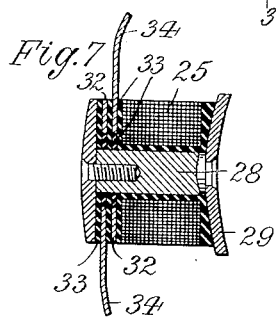
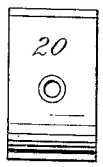
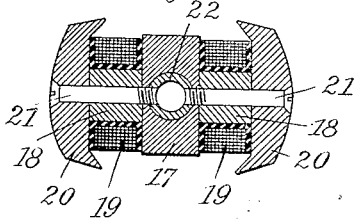
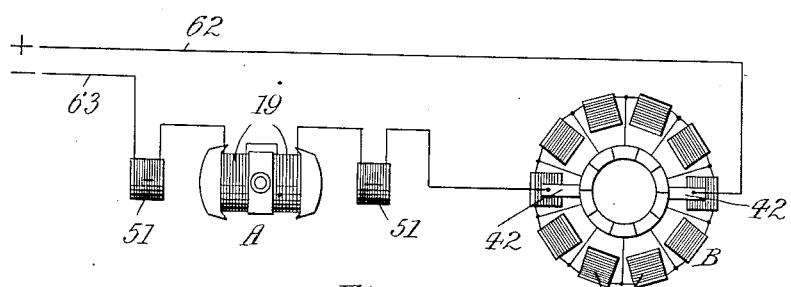
WITNESSES:
Katheryne Koch
Daniel Holmgren
INVENTOR
Benjamin F. Hutches Jr.
BY
Brieser & Jumper
ATTORNEYS

UNITED STATES PATENT OFFICE.

BENJAMIN F. HUTCHES, JR., OF ALLENDALE, NEW JERSEY.

ELECTROMOTOR.

1,116,705.  Specification of Letters Patent.  Patented Nov. 10, 1914.

Application filed May 3, 1910. Serial No. 559,193.

*To all whom it may concern:*

Be it known that I, BENJAMIN F. HUTCHES, Jr., a citizen of the United States, residing at Allendale, county of Bergen, State of New Jersey, have invented new and useful Improvements in Electromotors, of which the following is a specification.

This invention relates to an electromotor of novel construction which possesses high efficiency though of comparatively small size.

The electromotor is so constructed that its component parts may be readily assembled and separated so that any worn out or otherwise damaged elements may be readily replaced without skilled labor.

Although the construction is more particularly intended for application to motors of comparatively low power, I desire it to be understood that its various novel features may also be embodied in motors of larger sizes.

In the accompanying drawing: Figure 1 is an end view partly in section of my improved electromotor, Fig. 2 a side view thereof, Fig. 3 a vertical cross section on line 3—3, Fig. 5, Fig. 4 a detail of part of the mutilated yoke, Fig. 5 a vertical longitudinal section on line 5—5, Fig. 1, Fig. 6 a view similar to Fig. 1, with the brush-supporting cap removed, Fig. 7 an axial section through one of the armature-poles, Fig. 8 a cross section through the central field magnet, Fig. 9 a face view of one of the field pole shoes, and Fig. 10 a wiring diagram of the motor.

The bipolar centrally disposed field magnet A is, by screws 15, secured to a stationary plate 16 made of unmagnetizable material, such as brass. The field magnet A, preferably comprises a central block 17, a pair of alined cores 18 carrying field windings 19, and a pair of pole shoes 20, the parts 17, 18 and 20 being held together by screws 21. Block 17 is centrally perforated and is provided with a bushing 22, thus constituting the bearing for the motor shaft 23.

Around field magnet A is adapted to revolve the armature B which comprises essentially a disk or carrier 24 and a series of poles provided with the armature coils 25. Disk 24 has an elongated hub or sleeve 26 secured to shaft 23 by a screw 27 or otherwise. Each pole is composed of a core 28, riveted to a curved inner pole shoe 29, which is provided with a flange 30 secured to disk 24 by a screw 31. The ends of windings 25 are permanently connected to a pair of metal rings 32 insulated from each other and from cores 28 as at 33. Rings 32 are provided with integral resilient tongues or contact members 34 that extend in opposite directions from the poles and are of such a length and configuration that the tongues of adjoining poles will come into contact with one another, when the poles are secured to disk 24 by screws 31. Each contacting tongue pair is engaged by the free outer end of a contact spring 35 firmly embedded within an insulating bushing 36 which is fitted into a corresponding perforation of disk 24. The inner end of each spring 25 bears against the radially extending flange 37 of one of the commutator segments 38. The latter are mounted upon a flanged sleeve 39 encircling hub 26 of disk 24 and securely held thereto by screw 27. Segments 38 have dove-tailed inner ends and are clamped to sleeve 39 by a threaded ring 40, the segments being insulated from one another and from parts 39, 40 by insulating sheets 41 as usual.

The commutator brushes consist preferably of carbon blocks 42 loosely mounted in a pair of diametrically opposed boxes 43 and held in engagement with the commutator by springs 44. Boxes 43, are by clamp plates 45 and screws 46 secured to an annulus 47 of insulating material. This annulus is slotted as at 48 for the passage of screws 49 which adjustably hold it to a stationary flanged plate 50.

In order to concentrate the magnetic lines of force emanating from the poles of the field magnet, and thereby increasing the electromotive forces induced in the armature conductors while passing said poles, auxiliary field magnets 51 may be provided which should be arranged in axial alinement with the central field magnet. These auxiliary magnets are provided with inner pole shoes 52, while their outer poles are magnetically connected by a curved yoke 53 that constitutes the lower section of the motor casing. Above magnets 51, the casing may be formed by a curved segmental ring 54 made of unmagnetizable material. In order to regulate the concentrating efficiency of the auxiliary field magnets, yoke 53 may be more or less mutilated as at 55, thereby decreasing correspondingly the magnetic conductivity of said yoke.

Plate 50 is secured to yoke 53 and segment 54 by screws 56, while plate 16 is circumferentially recessed as at 57 to be driven into and securely held to yoke 53 and segment 54. A base plate 58 may be secured to yoke 53 by screws 59 to form a proper support for the motor.

An oil tube 61 passing through segment 54, block 17 and bushing 22 may be provided for properly lubricating the shaft bearing.

The wiring of the motor is preferably effected as shown in Fig. 10, the current flowing as follows: from live wire 62 through first brush 42, armature coils 25, second brush 42, the coil of first auxiliary field magnet 51, central field magnet coils 19, second auxiliary field magnet 51 to live wire 63.

It will be seen that by the construction described, all objectionable solder connections between the several armature coils, and between the latter and the commutator segments are dispensed with. When assembling the armature parts, i. e. when the pole shoes 29 of the armature coils are secured to disk 24, the tongues 34 of adjoining coils will come into contact with each other and with one of the contact springs 35 leading to the commutator segments. Thus if one of the coils 25 should become defective through short circuits or otherwise, the armature may be readily repaired by simply replacing the injured pole with a similar intact pole which may be kept in reserve for this purpose. So also, if the commutator should require repair, it may be withdrawn from hub 26 after loosening screw 27. When the commutator is refitted to hub 26, the connection between its segments and the armature conductors is automatically reëstablished owing to the frictional contact between flanges 37 and springs 35. By virtue of the employment of the core of the field magnet A as the shaft-bearing, space is economized, so that the size of the electromotor is reduced to a minimum.

I claim:

1. An electromotor, comprising a centrally arranged stationary field magnet, a shaft journaled in said magnet, a carrier secured to said shaft, a plurality of pole shoes secured to the carrier, magnetizable cores secured to the pole shoes, and coils surrounding the cores and having laterally extending conductive contact pieces, each contact piece of one coil contacting with the opposed contact piece of the adjoining coil.

2. An electromotor comprising a centrally arranged stationary field magnet, a shaft journaled in said magnet, a plurality of armature cores secured to the shaft, coils surrounding the cores, insulated conductive rings on the cores and connected to the ends of the coils, and tongues projecting in opposite directions from the rings, each tongue of one coil contacting with the opposed tongue of the adjoining coil.

3. An electromotor, comprising a centrally arranged stationary field magnet, a shaft journaled in said magnet, a plurality of armature cores secured to the shaft, coils surrounding the cores, laterally extending conductive members connected to the ends of the coils each member of one coil contacting with the opposed member of the adjoining coil, a contact spring engaging each contacting member-pair, and a commutator segment engaged by each contact-spring.

4. An electromotor, comprising a centrally arranged stationary field magnet, a shaft journaled in said magnet, a perforated carrier secured to the shaft, armature cores secured to the carrier, coils surrounding the cores, laterally extending conductive members connected to the ends of the coils, each member of one coil contacting with the opposed member of the adjoining coil, insulating bushings fitted into the carrier-perforations, a spring passing through each bushing and contactually engaging one of the contacting member-pairs, and a commutator segment engaged by each spring.

5. An electromotor comprising a centrally arranged stationary field magnet, a shaft journaled in said magnet, a plurality of armature cores secured to the shaft, coils surrounding the cores, contacting members connecting the ends of adjoining coils, contact springs engaging said members, and commutator-segments having flanges that are engaged by the contact-springs.

6. An electromotor, comprising a centrally arranged stationary field magnet, a shaft journaled in said magnet, a carrier having an elongated hub secured to the shaft, a plurality of armature coils fastened to the carrier, a commutator embracing the hub and having a plurality of insulated segments, and contact-springs that contactually connect each segment with the ends of adjoining coils.

7. In an electromotor, a support, a plurality of magnetizable cores removably secured thereto, coils surrounding the cores, and resilient conductive members extending in opposite directions from said coils and connected to the respective coil-ends, the members of any one coil contacting directly with the opposed members of the adjoining coils.

8. In an electromotor, a support, a plurality of magnetizable cores removably secured thereto, coils surrounding said cores, and resilient conductive members on said coils, each member of one coil contacting directly with the opposed member of the adjoining coil.

9. An electromotor comprising a centrally arranged field magnet, a shaft journaled therein, a carrier secured to said shaft, a plurality of magnetizable cores removably secured to the carrier, coils surrounding the cores and having laterally extending conductive members, the members of any one coil contacting with the opposed members of the adjoining coils.

10. An electromotor comprising a centrally arranged stationary field magnet, a shaft journaled therein, a carrier secured to said shaft, a plurality of magnetizable cores removably secured to the carrier, coils surrounding the cores and having laterally extending conductive members, the members of any one coil contacting with the opposed members of the adjoining coils, a commutator, and means for connecting each contacting member-pair with one commutator-segment.

BENJAMIN F. HUTCHES, Jr.

Witnesses:
 FRANK V. BRIESEN,
 ARTHUR E. ZUMPE.